(12) United States Patent
Shiung et al.

(10) Patent No.: US 8,355,628 B2
(45) Date of Patent: Jan. 15, 2013

(54) COMPACT CAMERA MODULE

(75) Inventors: Shin-Chang Shiung, Taichung (TW);
Chieh-Yuan Cheng, Hsinchu (TW);
Li-Hsin Tseng, Hsinchu (TW)

(73) Assignees: VisEra Technologies Company Limited, Hsinchu (TW); OmniVision Technologies, Inc., Santa Clara, CA (US)

( * ) Notice: Subject to any disclaimer, the term of this patent is extended or adjusted under 35 U.S.C. 154(b) by 39 days.

(21) Appl. No.: 12/399,706

(22) Filed: Mar. 6, 2009

(65) Prior Publication Data

US 2010/0226633 A1   Sep. 9, 2010

(51) Int. Cl.
*G03B 17/02* (2006.01)
*G03B 13/34* (2006.01)
*H01L 31/0232* (2006.01)

(52) U.S. Cl. .......... 396/542; 348/340; 359/824; 396/85; 396/529; 257/459

(58) Field of Classification Search .............. 396/80, 396/85, 86, 133, 542, 661; 359/696, 824; 257/431, 432, E31.127; 348/240.3, 340
See application file for complete search history.

(56) References Cited

U.S. PATENT DOCUMENTS

| | | | |
|---|---|---|---|
| 5,008,582 A * | 4/1991 | Tanuma et al. | 310/332 |
| 6,777,767 B2 | 8/2004 | Badehi | |
| 7,167,376 B2 * | 1/2007 | Miyashita et al. | 257/432 |
| 7,359,631 B2 * | 4/2008 | Naka et al. | 396/79 |
| 7,665,915 B2 * | 2/2010 | Lee | 396/542 |
| 7,683,960 B2 * | 3/2010 | Minami et al. | 348/340 |
| 7,863,724 B2 * | 1/2011 | Douriet et al. | 257/691 |
| 2004/0041282 A1 * | 3/2004 | Kinsman | 257/796 |
| 2005/0259174 A1 * | 11/2005 | Nishio et al. | 348/340 |
| 2006/0138905 A1 * | 6/2006 | Gonzales et al. | 310/331 |
| 2006/0152615 A1 * | 7/2006 | Kwon et al. | 348/340 |
| 2007/0147816 A1 * | 6/2007 | Humpston et al. | 396/72 |
| 2007/0154198 A1 * | 7/2007 | Oh et al. | 396/85 |
| 2007/0278701 A1 * | 12/2007 | Chang et al. | 257/787 |
| 2008/0142917 A1 * | 6/2008 | Lee et al. | 257/432 |
| 2008/0164553 A1 | 7/2008 | Lin et al. | |
| 2008/0217715 A1 | 9/2008 | Park et al. | |
| 2009/0213232 A1 * | 8/2009 | Asakura et al. | 348/208.4 |

FOREIGN PATENT DOCUMENTS

WO   WO 2006106953 A1 * 10/2006

* cited by examiner

*Primary Examiner* — Clayton E LaBalle
*Assistant Examiner* — Leon W Rhodes, Jr.
(74) *Attorney, Agent, or Firm* — Muncy, Geissler, Olds & Lowe, PLLC

(57) ABSTRACT

The invention provides a compact camera module. The compact camera module includes an image sensing device, a set of optical elements, and a zooming device. The set of optical elements connects to the image sensing device, and comprises a lens set. The zooming device connects to the set of optical elements for adjusting a distance between the lens set and the image sensing device. The zooming device directly electrically joins with the image sensing device.

6 Claims, 6 Drawing Sheets

COMPACT CAMERA MODULE

BACKGROUND OF THE INVENTION

1. Field of the Invention

The invention relates to photosensitive devices and more particularly to compact camera modules.

2. Description of the Related Art

A machine component of a conventional automatic focus compact camera module and zoom compact camera module is electrically connected to an external circuit board by a cable or a flexible printed circuit board. The external circuit board is electrically connected to an image sensor, and thus, the image sensor and the corresponding compact camera module are indirectly electrically connected. The electrical connections between conventional compact camera modules are complicated and an encapsulating material is required to assemble the conventional compact camera module and the corresponding image sensor. As a result, process costs are relatively high and product size is relatively larger, such that device performance and yield are negatively affected.

Thus, a novel compact camera module is required to solve the described problems.

BRIEF SUMMARY OF THE INVENTION

An embodiment of the invention provides a compact camera module. The compact camera module includes an image sensing device, a set of optical elements, and a zooming device. The set of optical elements connects to the image sensing device, and comprises a lens set. The zooming device connects to the set of optical elements for adjusting a distance between the lens set and the image sensing device. The zooming device directly electrically joins with the image sensing device.

An embodiment of the invention provides another compact camera module. The image sensor device includes an image sensor array chip, a package layer, a trace set, a transparent substrate, a set of optical elements, and a zooming device. The image sensor array chip comprises an image sensor array on a top surface thereof. The package layer underlies side surfaces and a bottom surface of the image sensor array chip. The trace set comprises a plurality of first traces and at least one second trace extending from the top surface of the image sensor array chip via side surfaces of the package layer to a bottom surface of the package layer. The transparent substrate covers the top surface of the image sensor array chip. The set of optical elements overlies the transparent substrate, aligns with the image sensor array, and comprises a lens set. The zooming device connects to the set of optical elements for adjusting a distance between the lens set and the image sensor array. The zooming device directly electrically joins with the at least one second trace.

An embodiment of the invention provides another compact camera module. The image sensor device includes an image sensor array chip, a through hole set, a trace set, a transparent substrate, a set of optical elements, and a zooming device. The image sensor array chip comprises an image sensor array on a top surface thereof. The through hole set comprises a plurality of first through holes and at least one second through hole passing through the image sensor array chip beyond the image sensor array. The trace set comprises a plurality of first traces and at least one second trace, wherein the plurality of first traces respectively extend from the top surface of the image sensor array chip via side surfaces of the first through holes to a bottom surface of the image sensor array chip, and the at least one second trace extend from the top surface of the image sensor array chip via side surfaces of the at least one through hole to the bottom surface of the image sensor array chip. The transparent substrate covers the top surface of the image sensor array chip. The set of optical elements overlies the transparent substrate, aligns with the image sensor array, and comprises a lens set. The zooming device connects to the set of optical elements for adjusting a distance between the lens set and the image sensor array. The zooming device directly electrically joins with the at least one second trace.

Further scope of the applicability of the invention will become apparent from the detailed descriptions given hereinafter. It should be understood however, that the detailed descriptions and specific examples, while indicating preferred embodiments of the invention, are given by way of illustration only, as various changes and modifications within the spirit and scope of the invention will become apparent to those skilled in the Art from the detailed descriptions.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1A:
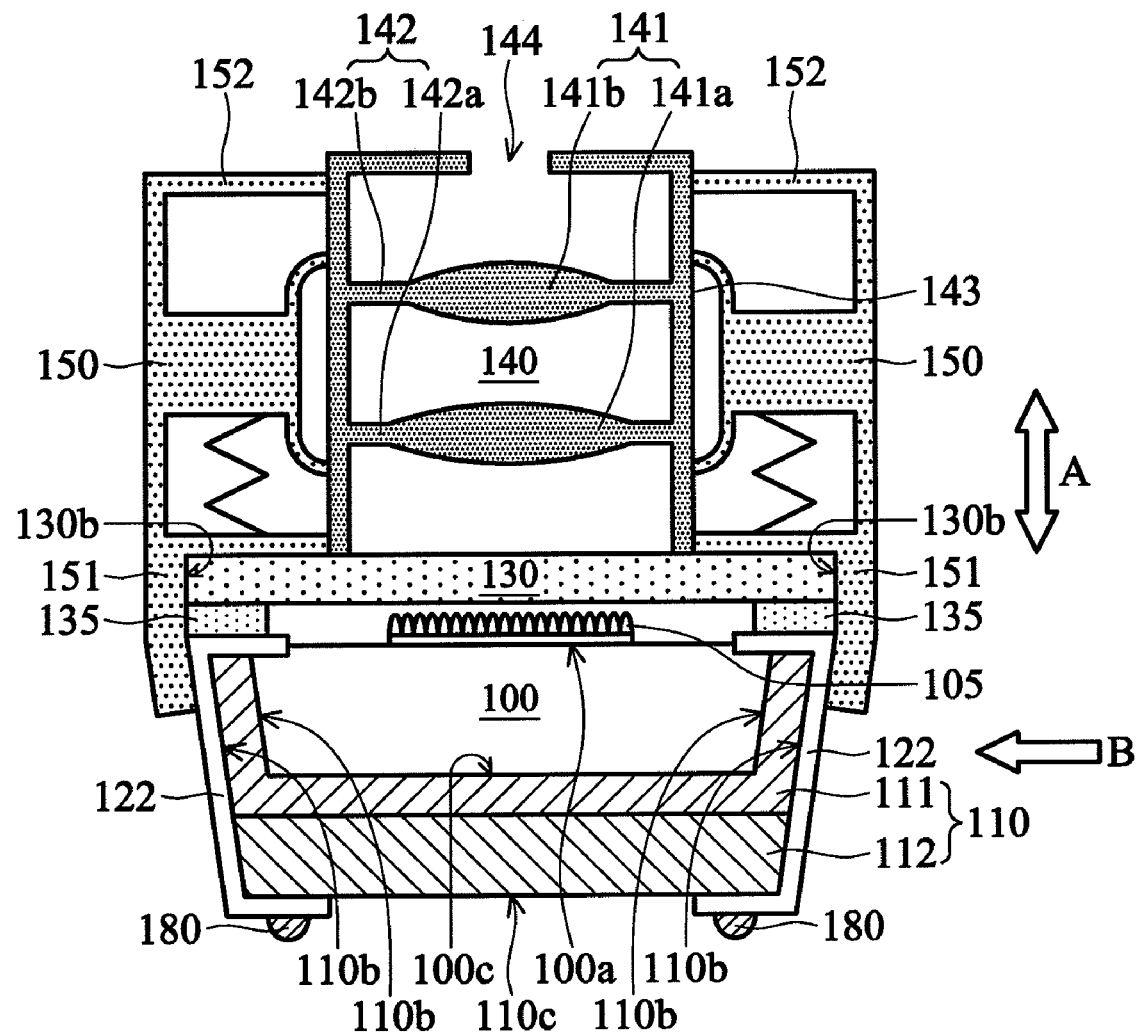
FIGS. 1A and 1B show schematic cross-sections of compact camera modules of a first embodiment of the invention.

The following description is of the best-contemplated mode of carrying out the invention. This description is made for the purpose of illustrating the general principles of the invention and should not be taken in a limiting sense. The scope of the invention is best determined by reference to the appended claims.

Next, the concepts and specific practice modes of the invention is detailedly described by the embodiments and the attached drawings. In the drawings or description, similar elements are indicated by similar reference numerals and/or letters. Further, the element shape or thickness in the drawings can be expanded for simplification or convenience of indication. Moreover, elements which are not shown or described can be in every form known by those skilled in the art.

Specific embodiments of the invention for fabrication of a chip scale package comprising an image sensor array chip are described. It is noted that the concepts of the invention can be applied to any known or newly developed package types of the image sensor array chip.

Figure 1B:
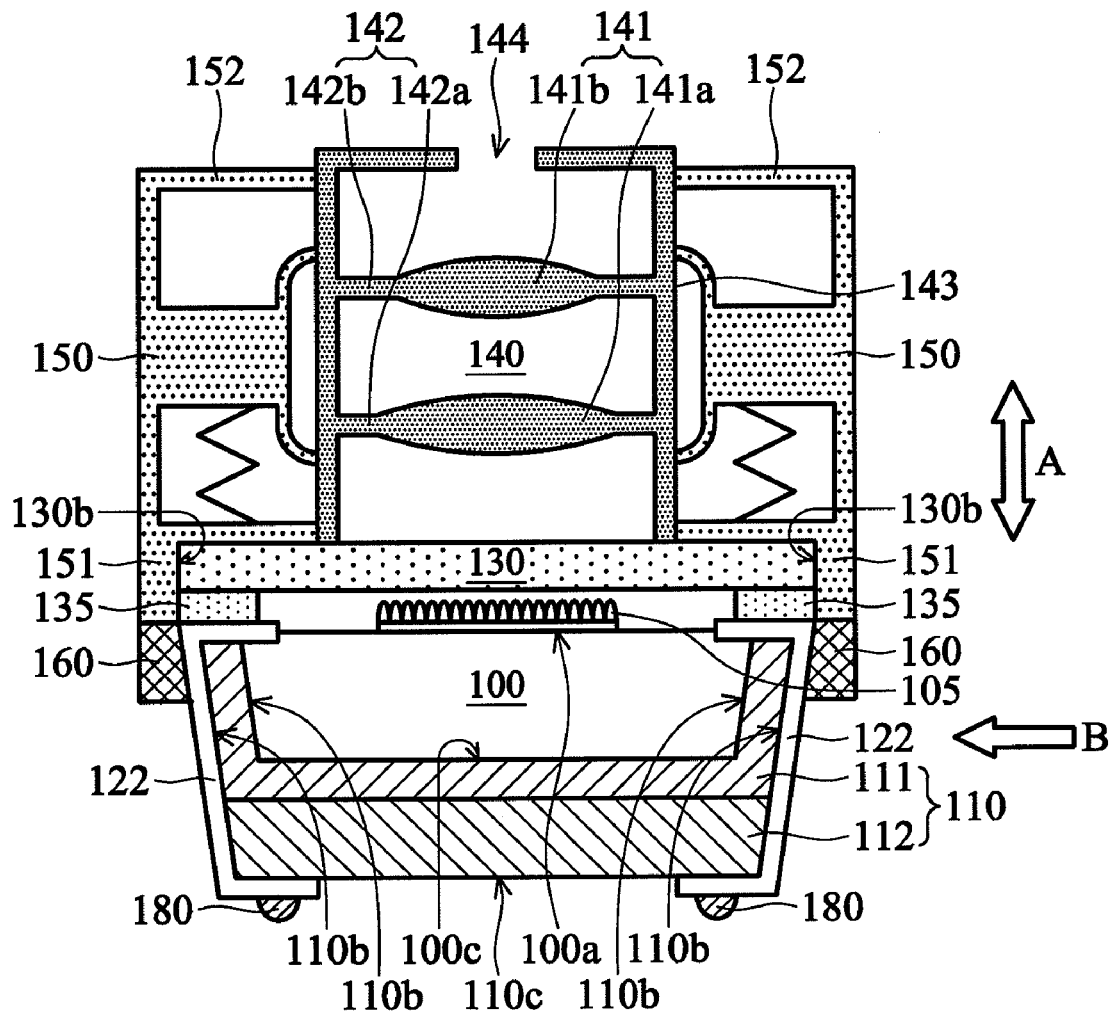
Figure 2A:
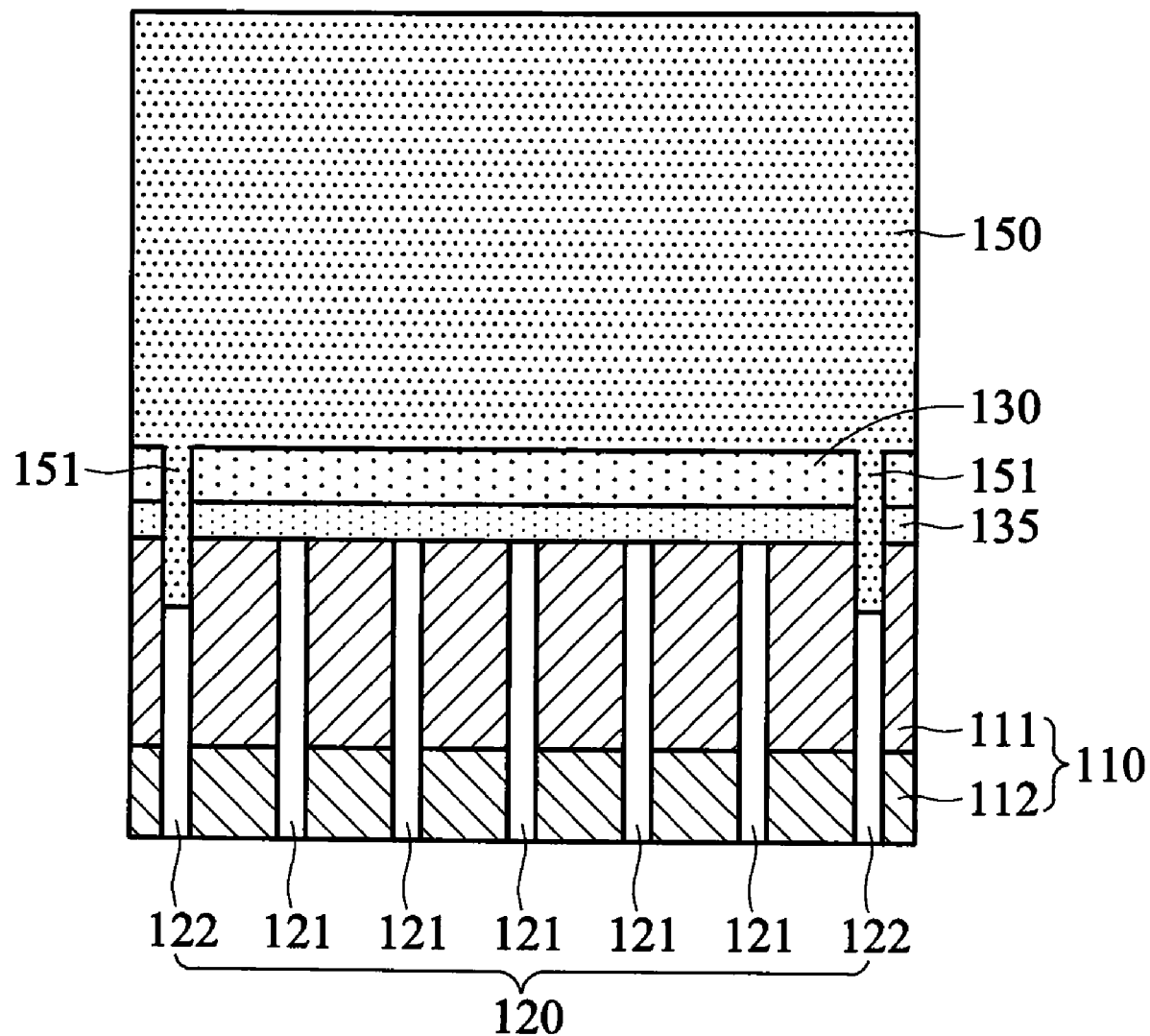
FIGS. 2A and 2B show exemplary side views of the compact camera module shown in FIG. 1A.
Figure 2B:
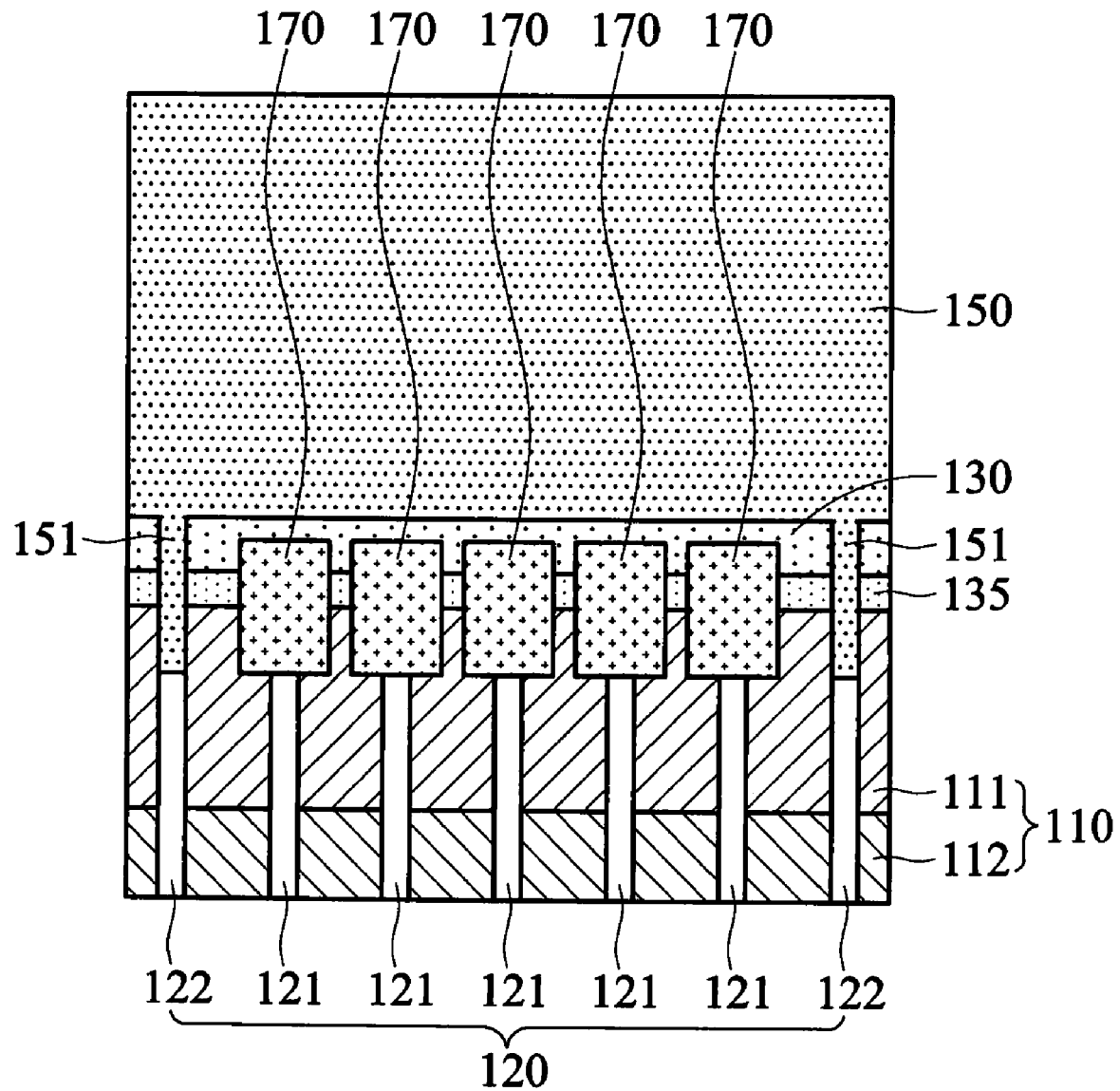

FIGS. 1A and 1B are schematic cross-sections of compact camera modules of a first embodiment of the invention. FIGS. 2A and 2B are exemplary side views of the compact camera module shown in FIG. 1A. Referring to FIGS. 1A and 1B, every compact camera module comprises an image sensing device, a set of optical elements 140, and a zooming device 150.

In this embodiment, the image sensing device comprises a chip scale package having an image sensor array chip 100, a package layer 110, a trace set 120 (see FIG. 2A or 2B), and a transparent substrate 130. The image sensor array chip 100 comprises an image sensor array 105 on a top surface 100a thereof. The image sensor array chip 100 is made of a semiconductor substrate such as elemental or compound semiconductors. In this embodiment, the image sensor array chip 100 is made of a single crystalline silicon substrate with predetermined electron components (not shown), interconnection wirings (not shown), and the image sensor array 105. The image sensor array 105 is a photosensitive component, such as an array of photodiodes in this embodiment for sensing incident light and generating corresponding electronic signals.

The package layer 110 underlies side surfaces 100b and a bottom surface 100c of the image sensor array chip 100. In this embodiment, the package layer 110 comprises an adhesion layer 111, such as epoxy, underlying the side surfaces 100b and the bottom surface 100c of the image sensor array chip 100, and a substrate layer 112 underlying the adhesion layer 111.

Referring to FIG. 1A and FIG. 2A or 2B, the trace set 120 comprises a plurality of first traces 121 and at least one second trace 122 extending from the top surface 100a of the image sensor array chip 100 via side surfaces 110b of the package layer 110 to a bottom surface 110c of the package layer 110. In this embodiment, the plurality of first traces 121 conducts the electronic signals generated by the image sensor array 105 and ground connection for the image sensor array chip 100, and the at least one second trace 122 is electrically joined to the zooming device 150. A formation method for the trace set is known by those skilled in the art (referring to U.S. Pat. No. 6,777,767 disclosed by Badehi, for example), and thus, is omitted herein. In this embodiment, a plurality of optional solder balls or bumps 180 are respectively attached to ends of the plurality of first traces 121 and the at least one second trace 122 underlying the package layer 110 for signal input/output and ground connection.

The transparent substrate 130 covers the top surface 100a of the image sensor array chip 100. More specifically, the transparent substrate 130 covers the image sensor array 105 of the image sensor array chip 100. The transparent substrate 130 can be glass, quartz, or other appropriate transparent materials. In this embodiment the transparent substrate 130 is glass, attached to and spaced from the image sensor array chip 100 by spacers 135.

In FIGS. 1A and 1B, the set of optical elements 140 connects to the image sensing device, and comprises a lens set 141. More specifically, the set of optical elements 140 overlies the transparent substrate 130, and aligns with the image sensor array 105. In this embodiment, the set of optical elements 140 further comprises a housing 143, a supporter set 142, and an aperture opening 144. The housing 143 is connected to the transparent substrate 130 of the image sensing device and supports the lens set 141. The housing 143 can be optionally coated by an opaque coating (not shown) to prevent unwanted light incidence into the image sensing device. The supporter set 142 holds and connects the lens set 141 to the housing 143. The aperture opening 144 exposes the lens set 141 and the image sensor array 105 to the environment for light incident.

In this embodiment, the set of optical elements 141 comprises a set of convex lenses 141a and 141b. In other embodiments, the set of optical elements 141 may comprise one single lens or more than two lenses, and the lens type can be properly selected as needed. In this embodiment, the supporter set 142 comprises a supporter 142a connecting the lens 141a of the set of optical elements 141 to the housing 143 and aligning the lens 141a with the image sensor array 105, and a supporter 142b connecting the lens 141b of the set of optical elements 141 to the housing 143 and aligning the lens 141b with the image sensor array 105 and the lens 141a. In other embodiments, the lenses 141a and 141b may directly connect to the housing 143 without any supporters.

Referring to FIG. 1A and FIG. 2A or 2B, the zooming device 150 connects to the set of optical elements 140 for adjusting a distance between the lens set 141 and the image sensing device; more specifically, the image sensor array 105. The zooming device 150 directly electrically joins with the image sensing device, and thus, the image sensing device can directly control the operation of the zooming device 150. More specifically, the image sensing device controls the zooming device 150 to move back and forth along a direction shown by an arrow A in FIG. 1 for zooming for image capture of the image sensor array 105 of the image sensing devices. The zooming device 150 can be selected from a group consisting of a piezo motor, a stepping motor, and a voice coil motor for the aforementioned operation.

In this embodiment, as shown in FIG. 1A, the zooming device 150 further comprises at least one extension part 151 directly electrically connected to the at least one second trace 122 of the image sensing device, and a housing 152 connected to the image sensing device and the set of optical elements 140. Thus, the image sensing device may transfer signals to the zooming device 150 via the at least one second trace 122 and the at least one extension part 151 for controlling the zooming operation of the zooming device 150. As compared with the prior art, the signal transfer path can be shortened, and thus, product performance can be improved. Further, the zooming device 150 directly electrically joins with the image sensing device, so a conventional cable, flexible printed circuit board, and encapsulating material are no longer required. Thus, the assembly process and structure of the image sensing device and the zooming device 150 is simplified, product size can be decreased, and product yield can be improved.

In this embodiment, as shown in FIG. 1A, the zooming device 150 directly electrically joins with the image sensing device at a position between the package layer 110 and the transparent substrate 130. More specifically, when considering the extension path of the at least one second trace 122 of the image sensing device, the zooming device 150 directly electrically joins with the image sensing device at a position between side surfaces 110b and 130b of the package layer 110 and the transparent substrate 130. For example, the at least one extension part 151 of the zooming device 150 may extend along the side surface 130b of the transparent substrate 130 to the position between side surfaces 110b of the package layer 110 and side surfaces of the spacers 135, and directly electrically contacts the at least one second trace 122 of the trace set 120 of the image sensing device. In a modified example, as shown in FIG. 1B, the at least one extension part 151 of the zooming device 150 may extend along the side surfaces of the transparent substrate 130 and the spaces 135, and the at least one second trace 122 is directly electrically joined to the zooming device 150, more specifically the at least one extension part 151, by a connection component 160, such as by solder, a retaining clamp, a thimble, or an anisotropic conduction paste for solid connection therebetween and/or decrease of contact resistance thereof.

FIGS. 2A and 2B show exemplary side views of the compact camera module along the arrow B shown in FIG. 1. Referring to FIG. 2A, the plurality of first traces 121 and the at least one second trace 122 of the trace set 120 are all kept exposed prior to assembly of the image sensing device and the zooming device 150, and then the at least one second trace 122 and the zooming device 150, more specifically the at least one extension part 151, are electrically joined. In other embodiments as shown in FIG. 2B, for example, the plurality of first traces 121 are respectively sealed by insulating material 170 at the position between side surfaces 110b and 130b (see FIG. 1) of the package layer 110 and the transparent substrate 130. Thus, the plurality of first traces 121 are protected from corrosion and peeling due to moisture penetration from the environment. The at least one second trace 122 and the zooming device 150, more specifically the at least one extension part 151, are electrically joined, and the joint can also protect the at least one second trace 122 from corrosion and peeling due to moisture penetration from the environment.

Figure 3:
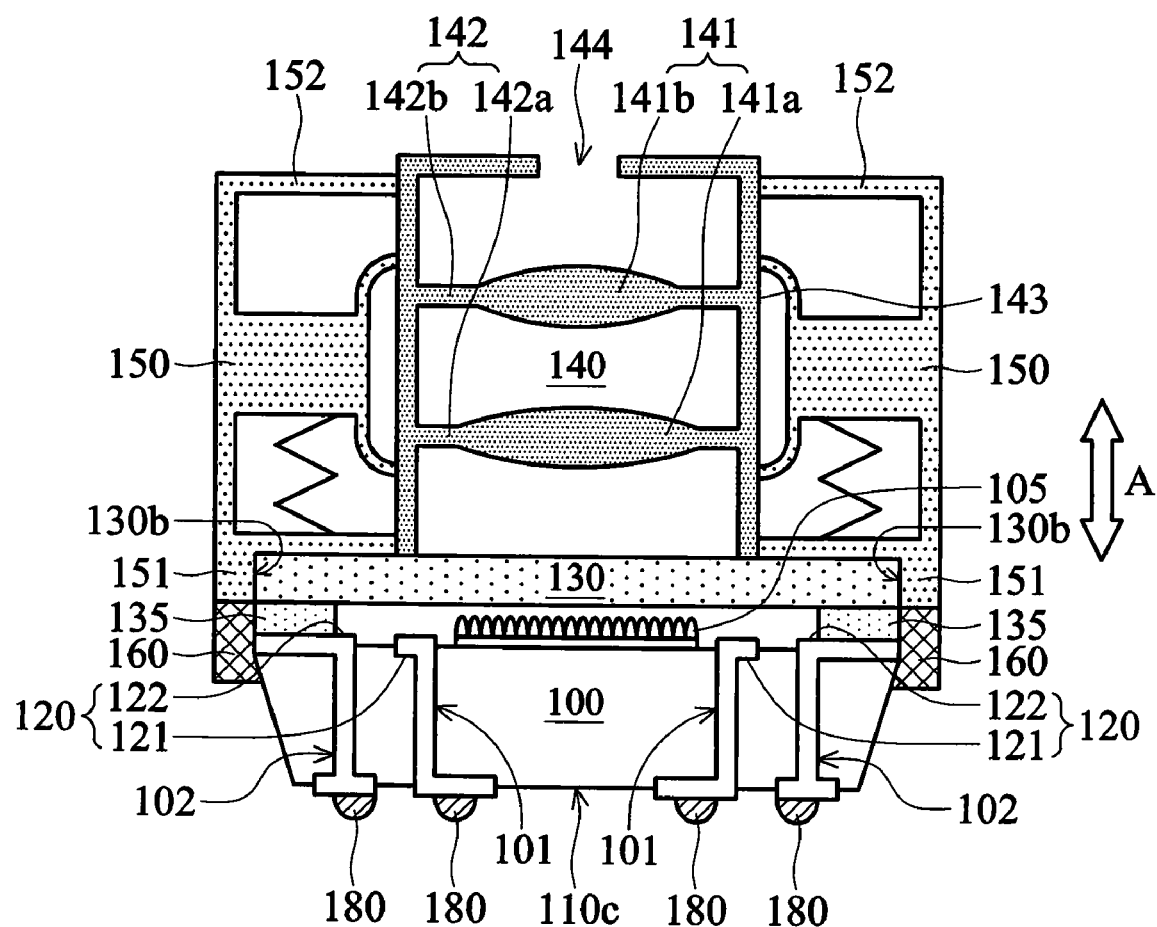
FIG. 3 shows a schematic cross-section of a compact camera module of a second embodiment of the invention.

FIG. 3 is a cross section of a compact camera module of a second embodiment of the invention. The compact camera module of this embodiment is nearly identical to that of the first embodiment, and for brevity, detailed descriptions of identical portions are omitted. The compact camera module of this embodiment is different from the first embodiment in the extension paths of the plurality of first traces 121 and the at least one second trace 122 of the trace set 120.

More specifically, the compact camera module of the second embodiment further comprises a through hole set comprising a plurality of first through holes 101 and at least one second through hole 102 passing through the image sensor array chip 100 beyond the image sensor array 105. The plurality of first traces 121 respectively extend from the top surface 100a of the image sensor array chip 100 via the plurality of first through holes 101 to a bottom surface 100c of the image sensor array chip 100. The at least one second trace 122 extends from the top surface 100a of the image sensor array chip 100 via the at least one second through hole 102 to the bottom surface 100c of the image sensor array chip 100. In this embodiment, a plurality of optional solder balls or bumps 180 are respectively attached to ends of the plurality of first traces 121 and the at least one second trace 122 on the bottom surface 100c of the image sensor array chip 100 for signal input/output and ground connection. Thus, the package layer 110 shown in FIGS. 1A and 1B of the compact camera modules of the first embodiment is not required. In some cases, the package layer 110 shown in FIGS. 1A and 1B can be optionally disposed as shown in FIG. 3, and the through hole set and the trace set 120 further extend to the bottom of the package layer 110.

In this embodiment, the at least one second trace 122 further extends through the top surface 100a of the image sensor array chip 100 to a position between side surfaces 100b and 130b of the image sensor array chip 100 and the transparent substrate 130. Thus, the zooming device 150, more specifically the at least one extension part 151, further extends along the side surface 130b of the transparent substrate 130 and electrically contacts with the at least one second trace 122 as described for FIGS. 1A, 1B, 2A and 2B.

Figure 4:
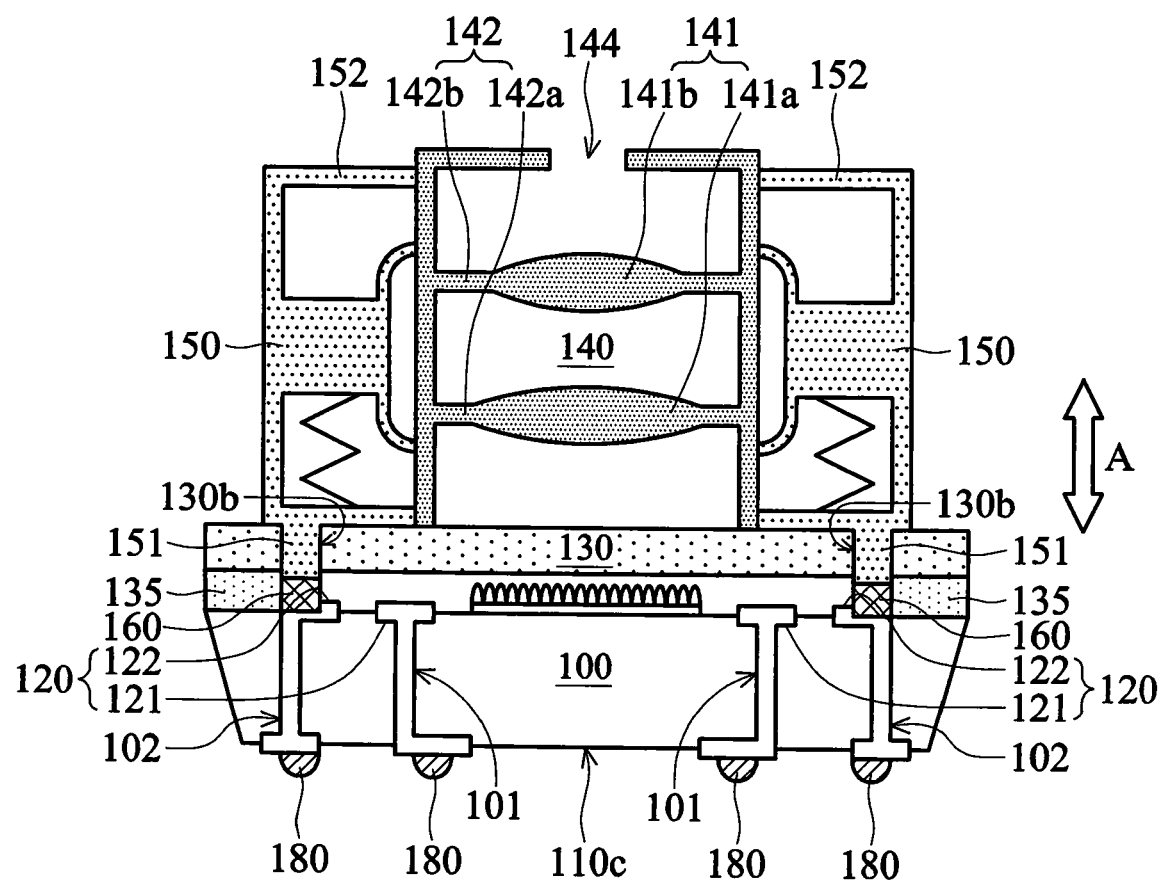
FIG. 4 shows a schematic cross-section of a compact camera module of a third embodiment of the invention.

FIG. 4 is a cross section of a compact camera module of a third embodiment of the invention. The compact camera module of this embodiment is nearly identical to that of the second embodiment, and for brevity, detailed descriptions of identical portions are omitted. The compact camera module of this embodiment is different from the second embodiment in that the zooming device 150, more specifically the at least one extension part 151, extends through the transparent substrate 130 and directly electrically joins with the at least one second trace 122. Thus, the at least one second trace 122 is not required to be extended through the top surface 100a of the image sensor array chip 100 to the position between side surfaces 100b and 130b of the image sensor array chip 100 and the transparent substrate 130. In other embodiments, the at least one second trace 122 is directly electrically joined to the zooming device 150, more specifically the at least one extension part 151, by a connection component 160, such as by solder or an anisotropic conduction paste for solid connection therebetween and/or decrease of contact resistance thereof.

While the invention has been described by way of example and in terms of preferred embodiment, it is to be understood that the invention is not limited thereto. To the contrary, it is intended to cover various modifications and similar arrangements (as would be apparent to those skilled in the Art). Therefore, the scope of the appended claims should be accorded the broadest interpretation so as to encompass all such modifications and similar arrangements.

What is claimed is:

1. A compact camera module, comprising:
   an image sensor array chip comprising an image sensor array on a top surface thereof;
   a package layer underlying side surfaces and a bottom surface of the image sensor array chip;
   a trace set comprising a plurality of first traces and at least one second trace, wherein the at least one second trace comprises a vertical portion extending from a top surface via a through hole to a bottom surface of the image sensor array chip and a horizontal portion extending to an outer surface of the image sensor array chip, and one end of the at least one second trace is connected to a solder ball;
   a transparent substrate covering the top surface of the image sensor array chip;
   a spacer between the transparent substrate and the image sensor array chip, wherein the horizontal portion is disposed between the spacer and the image sensor array chip;
   a set of optical elements overlying the transparent substrate, aligning with the image sensor array, and comprising a lens set; and
   a zooming device connecting to the set of optical elements for adjusting a distance between the lens set and the image sensor array, wherein
   the zooming device directly electrically joins with the at least one second trace.

2. The module as claimed in claim 1, wherein the zooming device directly electrically joins the image sensing device at a position between the package layer and the transparent substrate.

3. The module as claimed in claim 1, wherein the zooming device directly electrically joins the image sensing device at a position between side surfaces of the package layer and the transparent substrate.

4. The module as claimed in claim 3, wherein the plurality of first traces are respectively sealed by insulating material at a position between side surfaces of the package layer and the transparent substrate.

5. The module as claimed in claim 1, wherein the at least one second trace is directly electrically joined to the zooming device by solder, a retaining clamp, a thimble, or an anisotropic conduction paste.

6. The module as claimed in claim 1, wherein the zooming device is selected from a group consisting of a piezo motor, a stepping motor, and a voice coil motor.

* * * * *